(12) United States Patent
Kao (10) Patent No.: US 12,479,084 B2
(45) Date of Patent: Nov. 25, 2025

(54) MULTI-AXIS OPERATION APPARATUS IN OPPOSITE ARRANGEMENT

(71) Applicant: GALLANT MICRO. MACHINING CO., LTD., New Taipei (TW)

(72) Inventor: Wei-Han Kao, New Taipei (TW)

(73) Assignee: GALLANT MICRO. MACHINING CO., LTD., New Taipei (TW)

( * ) Notice: Subject to any disclaimer, the term of this patent is extended or adjusted under 35 U.S.C. 154(b) by 66 days.

(21) Appl. No.: 18/732,650

(22) Filed: Jun. 4, 2024

(65) Prior Publication Data

US 2025/0087516 A1 Mar. 13, 2025

(30) Foreign Application Priority Data

Sep. 11, 2023 (TW) ................................ 112134447

(51) Int. Cl.
*B25J 9/02* (2006.01)
*H01L 21/68* (2006.01)

(52) U.S. Cl.
CPC ............ *B25J 9/023* (2013.01); *H01L 21/681* (2013.01)

(58) Field of Classification Search
CPC .......... H01L 21/681; B25J 9/023; B25J 9/026
See application file for complete search history.

(56) References Cited

U.S. PATENT DOCUMENTS

| | | | |
|---|---|---|---|
| 2006/0045672 A1* | 3/2006 | Maynard | B65G 1/0435 414/276 |
| 2019/0381660 A1* | 12/2019 | Roy | B25J 9/04 |
| 2020/0114523 A1* | 4/2020 | Knuepfel | G06Q 20/145 |

FOREIGN PATENT DOCUMENTS

| | | |
|---|---|---|
| CN | 112272966 A | 1/2021 |
| KR | 1020210112243 A | 9/2021 |
| TW | 201240004 A1 | 10/2012 |

* cited by examiner

*Primary Examiner* — Minnah L Seoh
*Assistant Examiner* — Gregory T Prather
(74) *Attorney, Agent, or Firm* — Li & Cai Intellectual Property Office (57) ABSTRACT

A multi-axis operation apparatus in opposite arrangement includes a first operation mechanism, a second operation mechanism spaced apart from the first operation mechanism, and an indicator that is located between the first operation mechanism and the second operation mechanism. The first operation mechanism includes a first rail and a carrying platform that is assembled to the first rail. The second operation mechanism includes a second rail and a working member that is assembled to the second rail. The indicator includes a carrier, a first calibration, and a second calibration, the latter two of which are arranged on the carrier. The carrying platform and the working member respectively face toward the first calibration and the second calibration for obtaining current positions thereof, thereby allowing the working member to perform a predetermined step to a target object on the carrying platform through a window of the carrier.

10 Claims, 10 Drawing Sheets

MULTI-AXIS OPERATION APPARATUS IN OPPOSITE ARRANGEMENT

CROSS-REFERENCE TO RELATED PATENT APPLICATION

This application claims the benefit of priority to Taiwan Patent Application No. 112134447, filed on Sep. 11, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an operation apparatus, and more particularly to a multi-axis operation apparatus in opposite arrangement.

BACKGROUND OF THE DISCLOSURE

Working mechanisms included by a conventional multi-axis operation apparatus need to be aligned with each other when being operated, thereby meeting requirements of operational accuracy. However, in the conventional multi-axis operation apparatus, the alignment manner of the working mechanisms produces a tolerance which makes it unable to meet higher requirements for operational accuracy. For example, the alignment manner in the conventional multi-axis operation apparatus may use one of the working mechanisms as a fixed piece that is regarded as an alignment reference for other working mechanisms.

SUMMARY OF THE DISCLOSURE

In response to the above-referenced technical inadequacies, the present disclosure provides a multi-axis operation apparatus in opposite arrangement for effectively improving on the issues associated with a conventional multi-axis operation apparatus.

In order to solve the above-mentioned problems, one of the technical aspects adopted by the present disclosure is to provide a multi-axis operation apparatus in opposite arrangement, which includes a first operation mechanism, a second operation mechanism, and an indicator. The first operation mechanism includes a first rail and a carrying platform. The carrying platform is assembled to the first rail and is configured to allow a target object to be disposed thereon. The carrying platform includes a first position sensor and is movable along a first direction relative to the first rail. The second operation mechanism is spaced apart from the first operation mechanism along a spacing direction that is perpendicular to the first direction. The second operation mechanism includes a second rail and a working member. The working member is assembled to the second rail and includes a second position sensor. The working member is movable along a second direction relative to the second rail. The second direction is perpendicular to the spacing direction and is not parallel to the first direction. The indicator is disposed between the first operation mechanism and the second operation mechanism. The indicator includes a carrier, a first calibration, and a second calibration. The carrier has an operation window. The working member is configured to face toward the target object along the spacing direction through the operation window. The first calibration and the second calibration are arranged on the carrier. The first position sensor faces toward the first calibration along the spacing direction, and the second position sensor faces toward the second calibration along the spacing direction. When the multi-axis operation apparatus is operated to perform a predetermined process, the first position sensor and the second position sensor are in cooperation with the first calibration and the second calibration of the indicator so as to obtain current positions of the carrying platform and the working member, thereby allowing the working member to perform a predetermined step to a predetermined region of the target object along the spacing direction through the operation window.

Therefore, the multi-axis operation apparatus of the present disclosure is provided with the indicator that is a fixed alignment reference between the first operation mechanism and the second operation mechanism, so that a distance between the first operation mechanism and the alignment reference (i.e., the indicator) and a distance between the second operation mechanism and the alignment reference (i.e., the indicator) can be effectively decreased, thereby reducing a tolerance occurred in the multi-axis operation apparatus to meet requirements of higher operational accuracy.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 10, an embodiment of the present disclosure is provided. As shown in FIG. 1 to FIG. 5, the present embodiment provides a multi-axis operation apparatus 100 in opposite arrangement. The multi-axis operation apparatus 100 is configured to be operated to perform a predetermined process that can be adjusted or changed according to design requirements. For example, the multi-axis operation apparatus 100 shown in the drawings of the present embodiment is in cooperation with a chip supplying platform 200 for performing a chip-bonding process. However, in other embodiments of the present disclosure not shown in the drawings, the multi-axis operation apparatus 100 can be operated to perform a pick-and-place process or a detection process according to design requirements.

Figure 1:
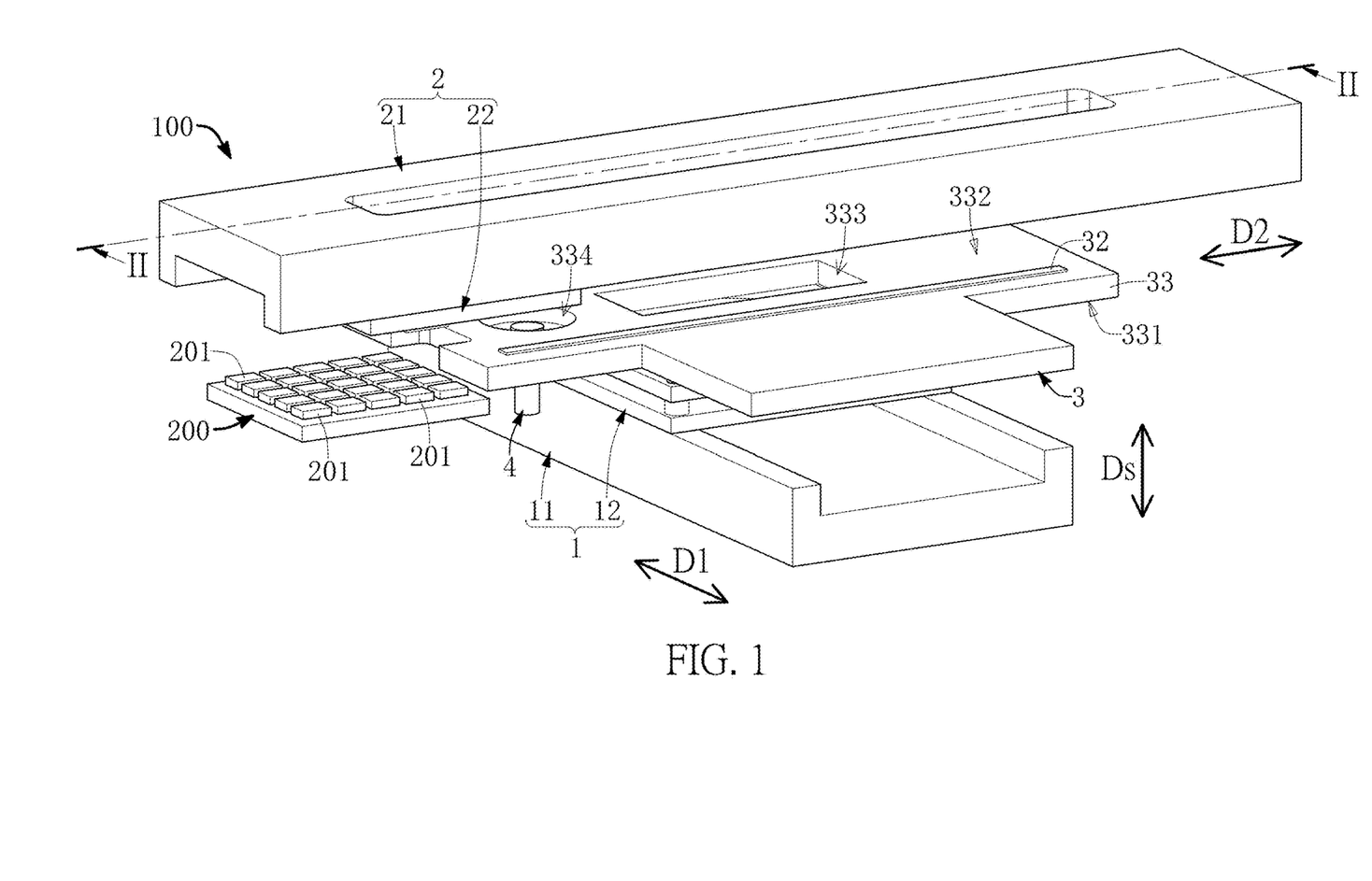
FIG. 1 is a schematic perspective view of a multi-axis operation apparatus in opposite arrangement according to an embodiment of the present disclosure.
Figure 2:
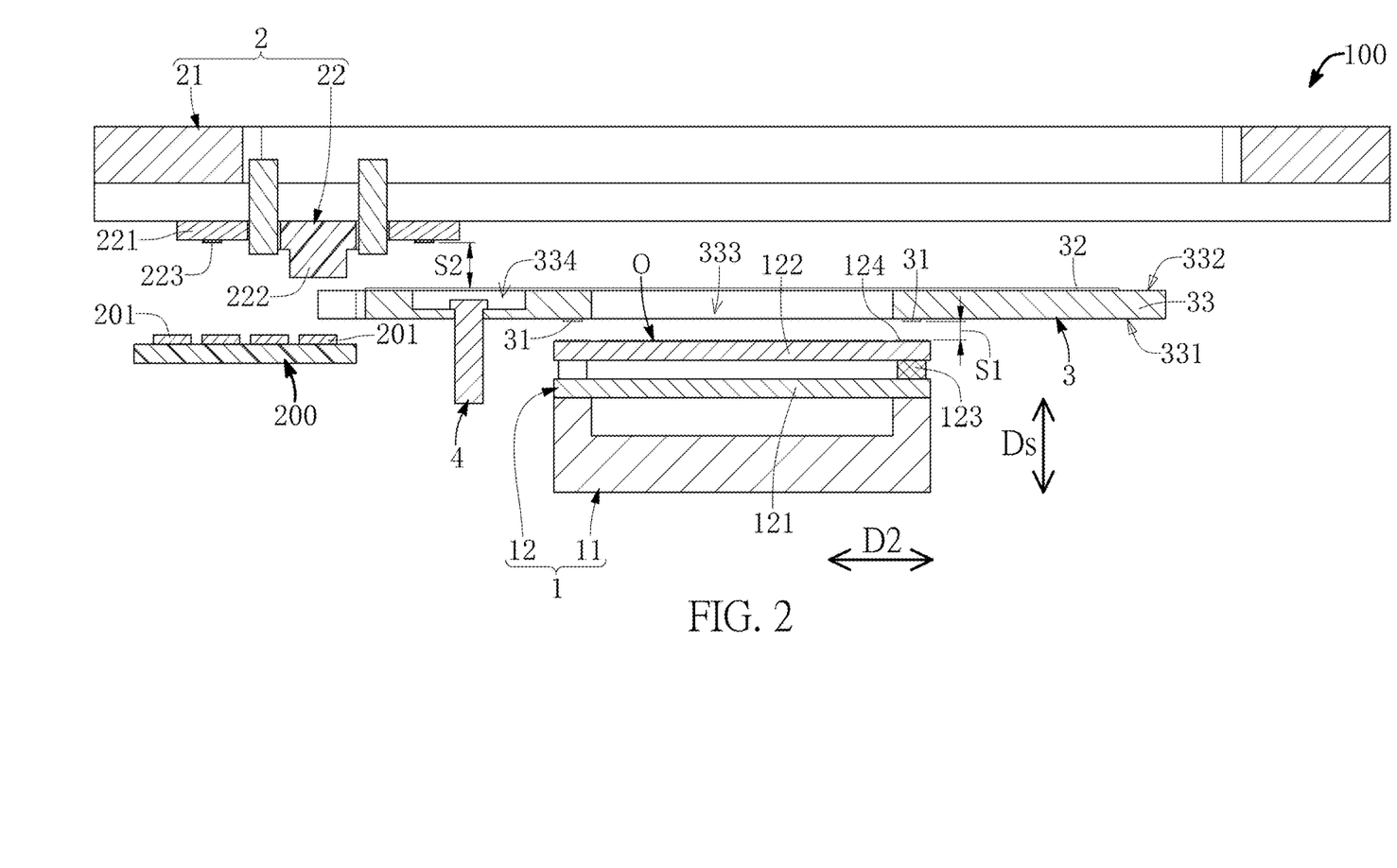
FIG. 2 is a schematic cross-sectional view taken along line II-II of FIG. 1.
Figure 3:
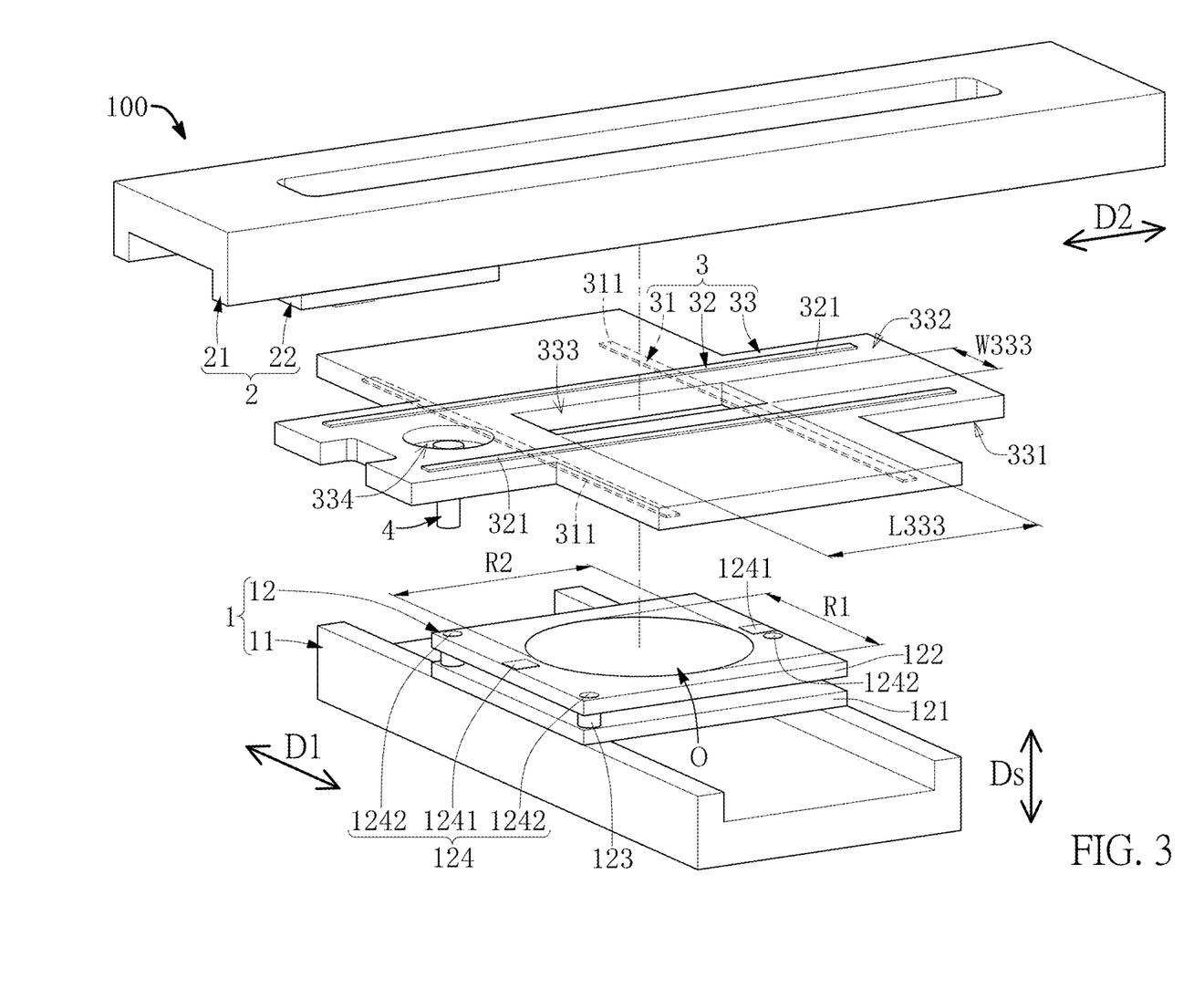
FIG. 3 is a schematic exploded view of FIG. 1.
Figure 4:
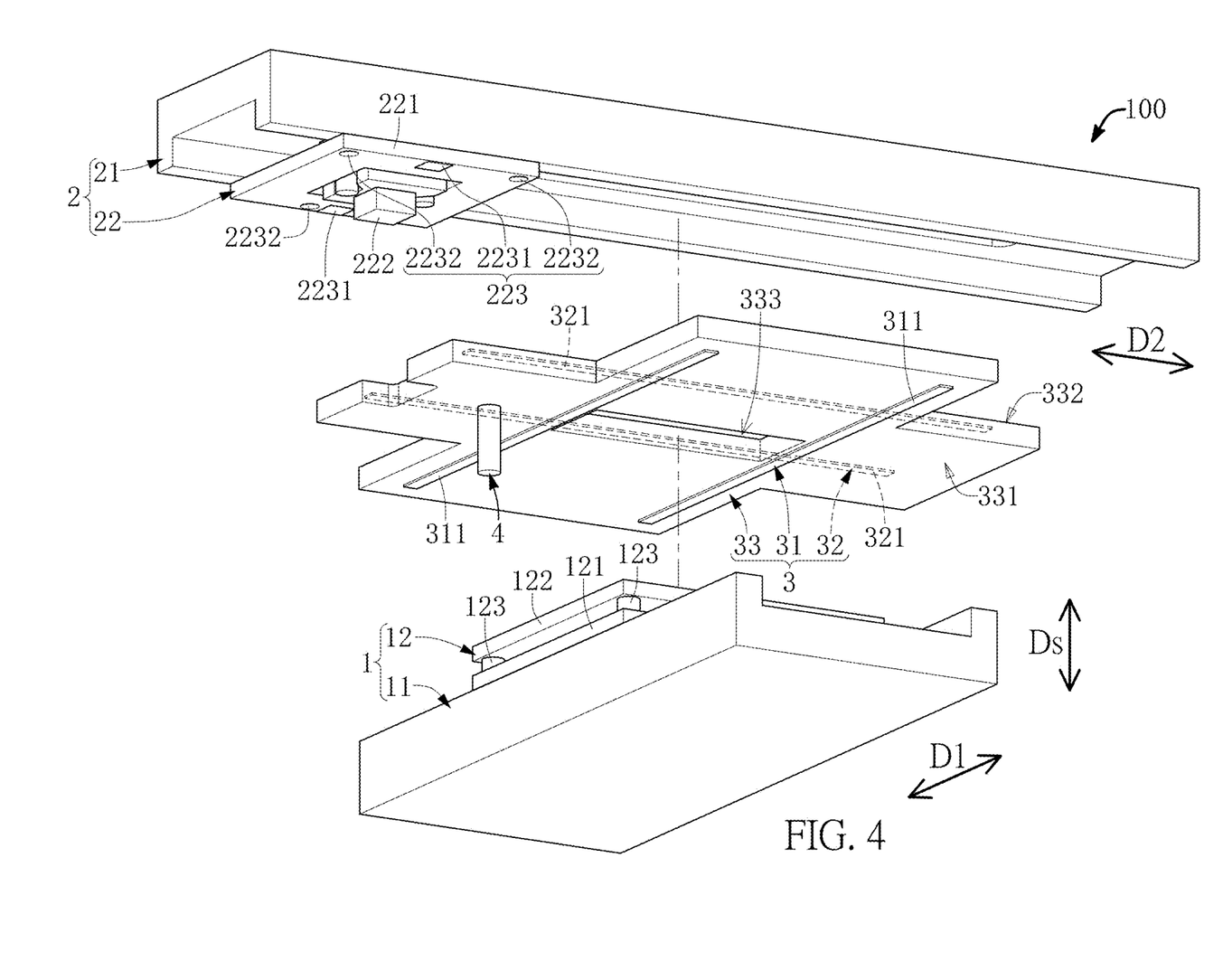
FIG. 4 is a schematic exploded view of FIG. 1 from another angle of view.

As shown in FIG. 2 to FIG. 4, the multi-axis operation apparatus 100 in the present embodiment includes a first operation mechanism 1, a second operation mechanism 2 spaced apart from the first operation mechanism 1 along a spacing direction Ds, an indicator 3 disposed between and spaced apart from the first operation mechanism 1 and the second operation mechanism 2, and a correction mechanism 4 that corresponds in position to the indicator 3, but the present disclosure is not limited thereto.

For example, in other embodiments of the present disclosure not shown in the drawings, the correction mechanism 4 can be replaced by other components or can be omitted according to design requirements. In addition, the spacing direction Ds in the present embodiment is a vertical direction, but the present disclosure is not limited thereto. The following description describes the structure and connection relationship of the mechanisms included by the multi-axis operation apparatus 100 of the present embodiment.

The first operation mechanism 1 includes a first rail 11 and a carrying platform 12 that is assembled to the first rail 11. The first rail 11 can be a linear guideway having a straight shape that is parallel to a first direction D1 perpendicular to the spacing direction Ds, but the present disclosure is not limited thereto. The carrying platform 12 is configured to allow a target object O (e.g., a board for carrying chips) to be disposed thereon, and the carrying platform 12 is movable along the first direction D1 relative to the first rail 11.

Specifically, the carrying platform 12 in the present embodiment includes a bottom board 121, a top board 122 spaced apart from the bottom board 121 along the spacing direction Ds, a plurality of fine-tuning members 123 sandwiched between and connected to the bottom board 121 and the top board 122, and a plurality of first position sensors 124 that are disposed on the top board 122 and that are arranged away from the bottom board 121, but the present disclosure is not limited thereto. For example, in other embodiments of the present disclosure not shown in the drawings, a structure jointly defined by the bottom board 121, the top board 122, and the fine-tuning members 123 can be adjusted or changed according to design requirements, and a quantity of the first position sensors 124 can be at least one.

In the present embodiment, the bottom board 121 is movably disposed on the first rail 11 along the first direction D1, and a relative position between the bottom board 121 and the top board 122 can be adjusted through the fine-tuning members 123. For example, the fine-tuning members 123 can be adjusted to have different lengths in the spacing direction Ds, thereby effectively adjusting a horizontal level of the top board 122 with respect to the bottom board 121.

Moreover, a top surface of the top board 122 is configured to allow the target object O to be disposed thereon, the first position sensors 124 are disposed on the top surface of the top board 122 and are arranged around the target object O, thereby facilitating detection and operation that are implemented by the cooperation of the first position sensors 124 and the indicator 3.

Specifically, the first position sensors 124 include a plurality of first XY-axis sensors 1241 and a plurality of first Z-axis sensors 1242. The first XY-axis sensors 1241 are arranged along a second direction D2 perpendicular to the spacing direction Ds and the first direction D1, and are respectively located at two opposite sides of the target object O. The first Z-axis sensors 1242 and the first XY-axis sensors 1241 are arranged in two rows each parallel to the first direction D1, and the first Z-axis sensors 1242 preferably correspond in position to the fine-tuning members 123, respectively, thereby accurately providing sensing data that are needed for the operation of the fine-tuning members 123.

It should be noted that the second direction D2 can be not parallel to the first direction D1, and the second direction D2 of the present embodiment is preferably perpendicular to the first direction D1.

The second operation mechanism 2 includes a second rail 21 and a working member 22 that is assembled to the second rail 21. The second rail 21 can be a linear guideway having a straight shape that is parallel the second direction D2, but the present disclosure is not limited thereto. The working member 22 is movable along the second direction D2 relative to the second rail 21.

The working member 22 in the present embodiment includes a ring-shaped board 221, a capturer 222 movably passing through the ring-shaped board 221, and a plurality of second position sensors 223 that are disposed on the ring-shaped board 221, but the present disclosure is not limited thereto. For example, in other embodiments of the present disclosure not shown in the drawings, a quantity of the second position sensors 223 can be at least one; or, the capturer 222 can be adjusted or changed according to design requirements (e.g., when the multi-axis operation apparatus 100 is operated to perform the detection process, the capturer 222 can be replaced by a camera).

In the present embodiment, the ring-shaped board 221 is movably disposed on the second rail 21 along the second direction D2 and is configured to drive the capturer 222 for enabling the ring-shaped board 221 and the capturer 222 to be jointly moved along the second direction D2, and the capturer 222 is movable along the spacing direction Ds relative to the ring-shaped board 221. Moreover, the second position sensors 223 are disposed on a bottom surface of the ring-shaped board 221 and are arranged around the capturer 222.

Specifically, the second position sensors 223 include a plurality of second XY-axis sensors 2231 and a plurality of second Z-axis sensors 2232. The second XY-axis sensors 2231 are arranged along the first direction D1, and are respectively located at two opposite sides of the capturer 222. The second Z-axis sensors 2232 and the second XY-axis sensors 2231 are arranged in two rows each parallel to the second direction D2, thereby accurately providing sensing data that are required from the capturer 222.

The indicator 3 includes a carrier 33, a first calibration 31, and a second calibration 32. The first calibration 31 and the second calibration 32 are respectively arranged on two opposite sides of the carrier 33. It should be noted that the first calibration 31 and the second calibration 32 can be integrally formed on the carrier 33 so as to be jointly formed as a single one-piece structure (e.g., the first calibration 31 and the second calibration 32 can be carved on surfaces of the carrier 33); or, the first calibration 31 and the second calibration 32 can be additionally assembled to the carrier 33, but the present disclosure is not limited thereto.

Specifically, the carrier 33 in the present embodiment is a board having a first board surface 331 and a second board surface 332 that is opposite to the first board surface 331. The carrier 33 has an operation window 333 penetrating there-through, the first calibration 31 is arranged on the first board surface 331, and the second calibration 32 is arranged on the second board surface 332, but the present disclosure is not limited thereto. For example, in other embodiments of the present disclosure not shown in the drawings, when the multi-axis operation apparatus 100 is configured to perform the detection process, the operation window 333 can be a transparent part of the carrier 33 and does not penetrate through the carrier 33.

In the present embodiment, each of the first calibration 31 and the second calibration 32 has two linear encoders 311, 321 (e.g., optical rulers). The two linear encoders 311 of the first calibration 31 are parallel to the first direction D1, and are arranged at two opposite sides of the operation window 333 along the second direction D2. Moreover, the two linear encoders 321 of the second calibration 32 are parallel to the second direction D2, and are arranged at two opposite sides of the operation window 333 along the first direction D1.

Specifically, each of the first position sensors 124 faces toward the first calibration 31 along the spacing direction Ds, and is spaced apart from the first calibration 31 along the spacing direction Ds by a first sensing distance S1. In other words, when the carrying platform 12 is moved along the first direction D1 relative to the first rail 11, each of the first position sensors 124 is moved along a first path. Moreover, a first projection region defined by orthogonally projecting the first path onto the carrier 33 along the spacing direction Ds is overlapped with the first calibration 31.

Each of the second position sensors 223 faces toward the second calibration 32 along the spacing direction Ds, and is spaced apart from the second calibration 32 along the spacing direction Ds by a second sensing distance S2 that is preferably within a range from 90% to 110% of the first sensing distance S1. In other words, when the working member 22 is moved along the second direction D2 relative to the second rail 21, each of the second position sensors 223 is moved along a second path. Moreover, a second projection region defined by orthogonally projecting the second path onto the carrier 33 along the spacing direction Ds is overlapped with the second calibration 32.

In addition, the working member 22 of the second operation mechanism 2 is configured to face toward the target object O, which is disposed on the first operation mechanism 1, along the spacing direction Ds through the operation window 333 of the indicator 3. In order to enable the multi-axis operation apparatus 100 to perform the predetermined process to the target object O, the operation window 333 preferably has at least one of the following features.

Figure 5:
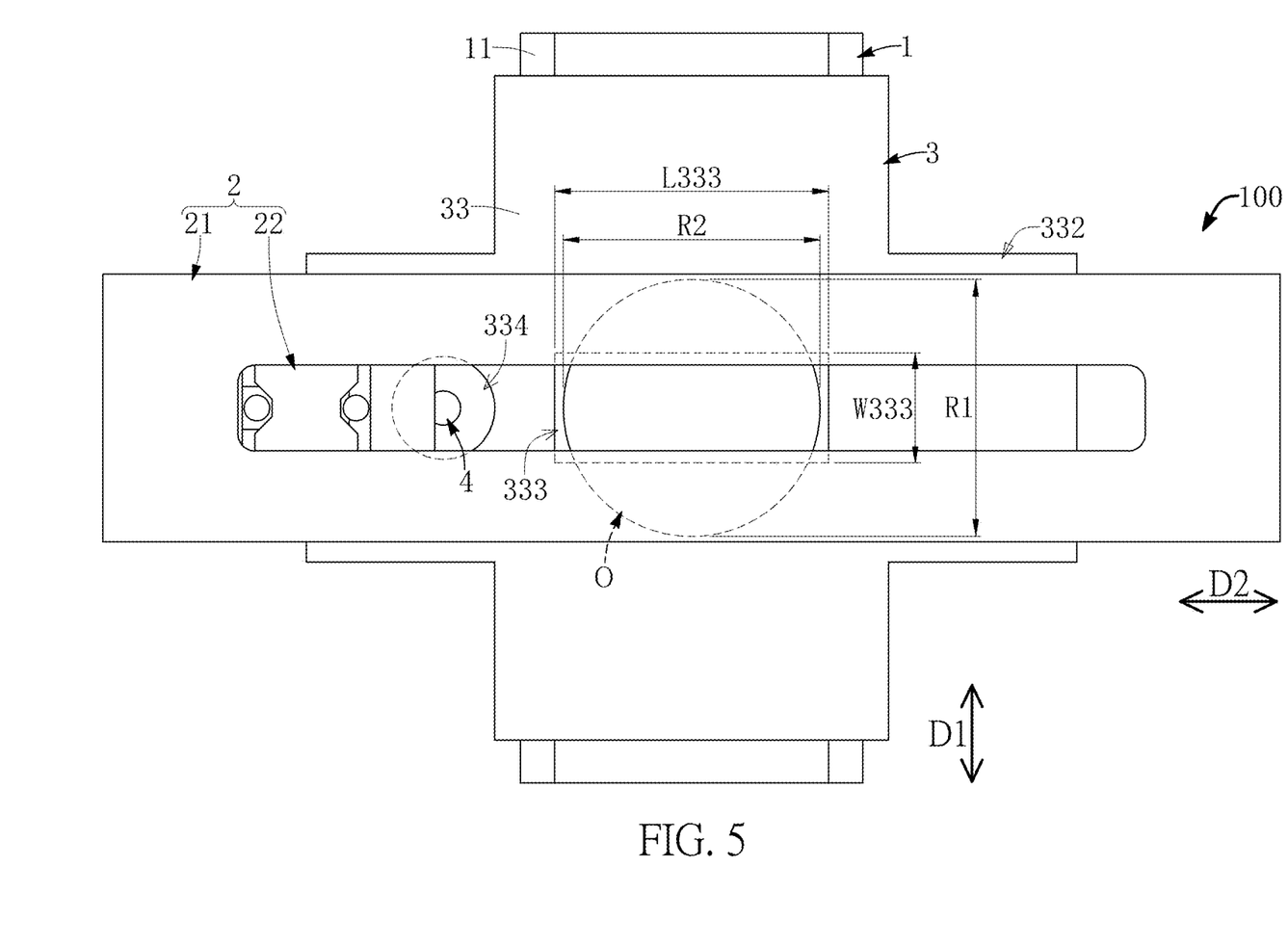
FIG. 5 is a schematic top view of FIG. 1.

The operation window 333 has a width W333 in the first direction D1 and a length L333 in the second direction D2. The length L333 of the operation window 333 is greater than or equal to an outer diameter R2 of the target object O in the second direction D2, and the width W333 of the operation window 333 is less than an outer diameter R1 of the target object O in the first direction D1.

Moreover, the carrying platform 12 is movable along the first direction D1 by a first distance that is greater than or equal to a difference between the width W333 of the operation window 333 and the outer diameter R1 of the target object O in the first direction D1, and the working member 22 is movable along the second direction D2 by a second distance. Accordingly, the movement of the carrying platform 12 and the movement of the working member 22 are cooperated with each other through a specific size of the operation window 333, such that the working member 22 can perform the predetermined process to any region of the target object O.

Furthermore, in order to enable the multi-axis operation apparatus to have a higher operational accuracy, the first sensing distance S1 is preferably less than 50% of the first distance, and the second sensing distance S2 is preferably less than 50% of the second distance, but the present disclosure is not limited thereto.

Figure 7:
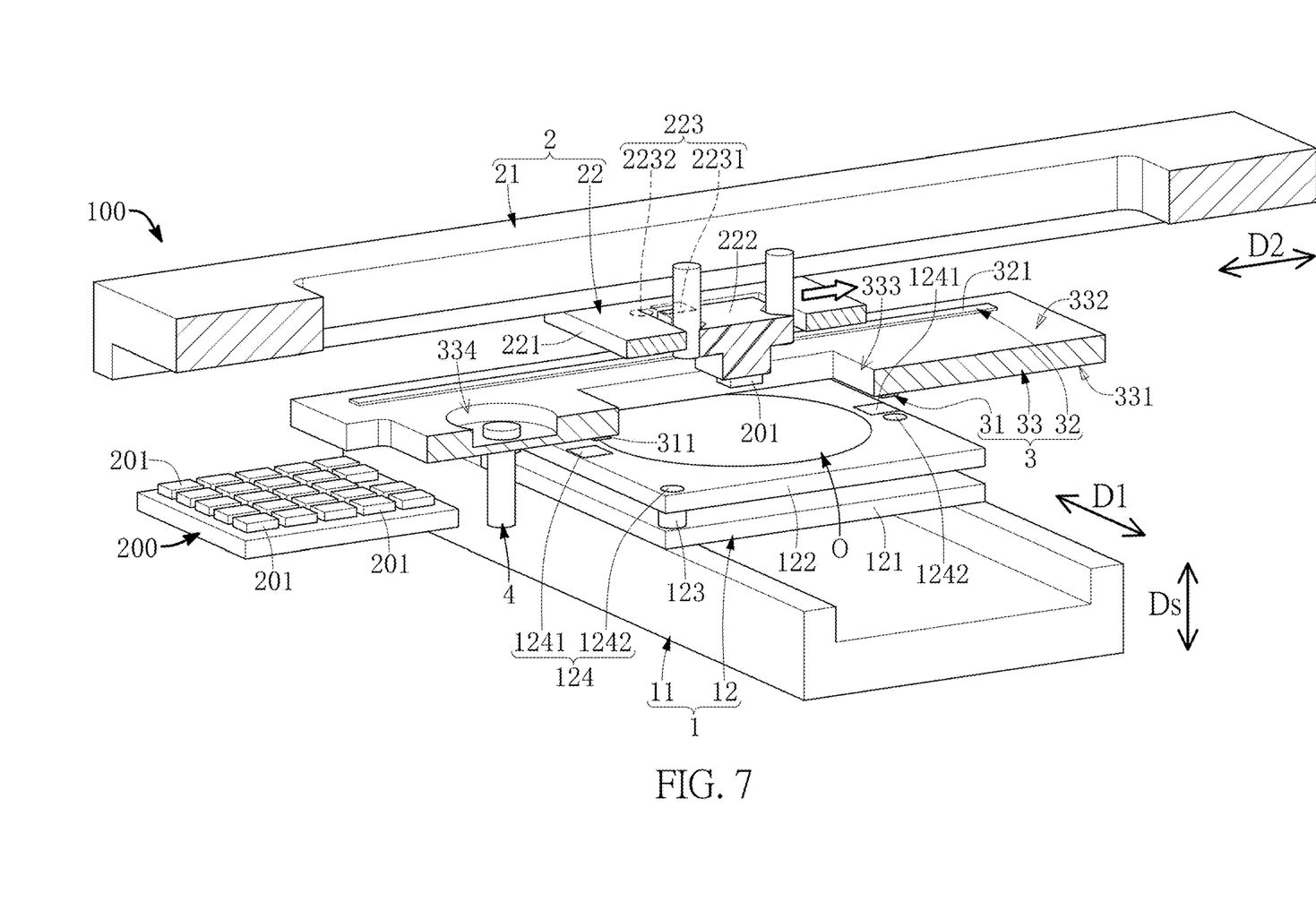
Figure 8:
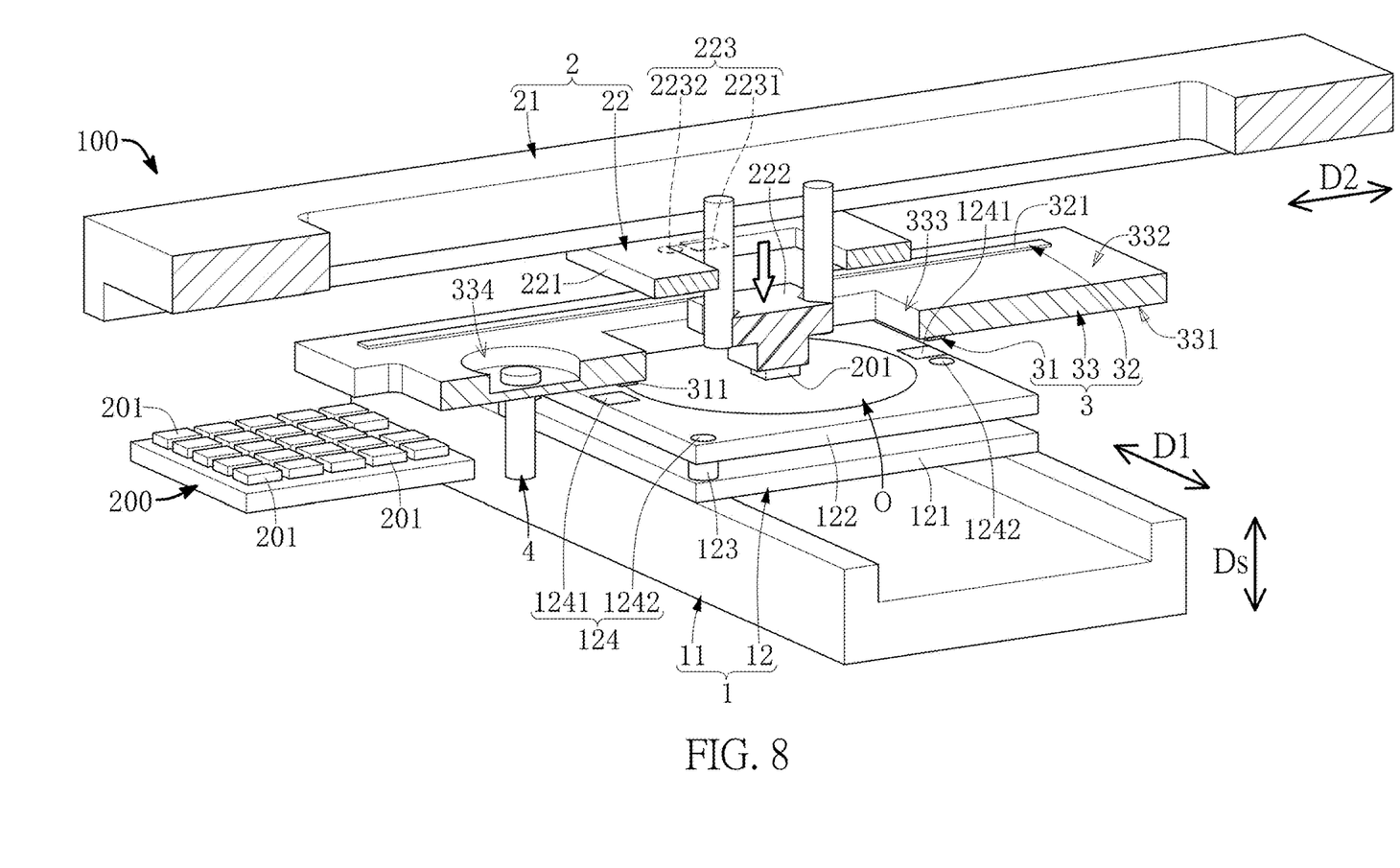

In summary, when the multi-axis operation apparatus 100 is operated to perform the predetermined process (e.g., the chip-bonding process, the pick-and-place process, or the detection process), the first position sensors 124 and the second position sensors 223 are in cooperation with the first calibration 31 and the second calibration 32 of the indicator 3 so as to obtain current positions of the carrying platform 12 and the working member 22, thereby allowing the working member 22 to perform a predetermined step (as shown in FIG. 7 and FIG. 8) to a predetermined region of the target object O along the spacing direction Ds through the operation window 333. The predetermined step in the present embodiment means tasks that the working member 22 is configured to perform.

Accordingly, the multi-axis operation apparatus 100 of the present embodiment is provided with the indicator 3 that is a fixed alignment reference between the first operation mechanism 1 and the second operation mechanism 2, so that a distance between the first operation mechanism 1 and the alignment reference (i.e., the indicator 3) and a distance between the second operation mechanism 2 and the alignment reference (i.e., the indicator 3) can be effectively decreased, thereby reducing a tolerance occurred in the multi-axis operation apparatus 100 to meet requirements of higher operational accuracy.

Figure 6:
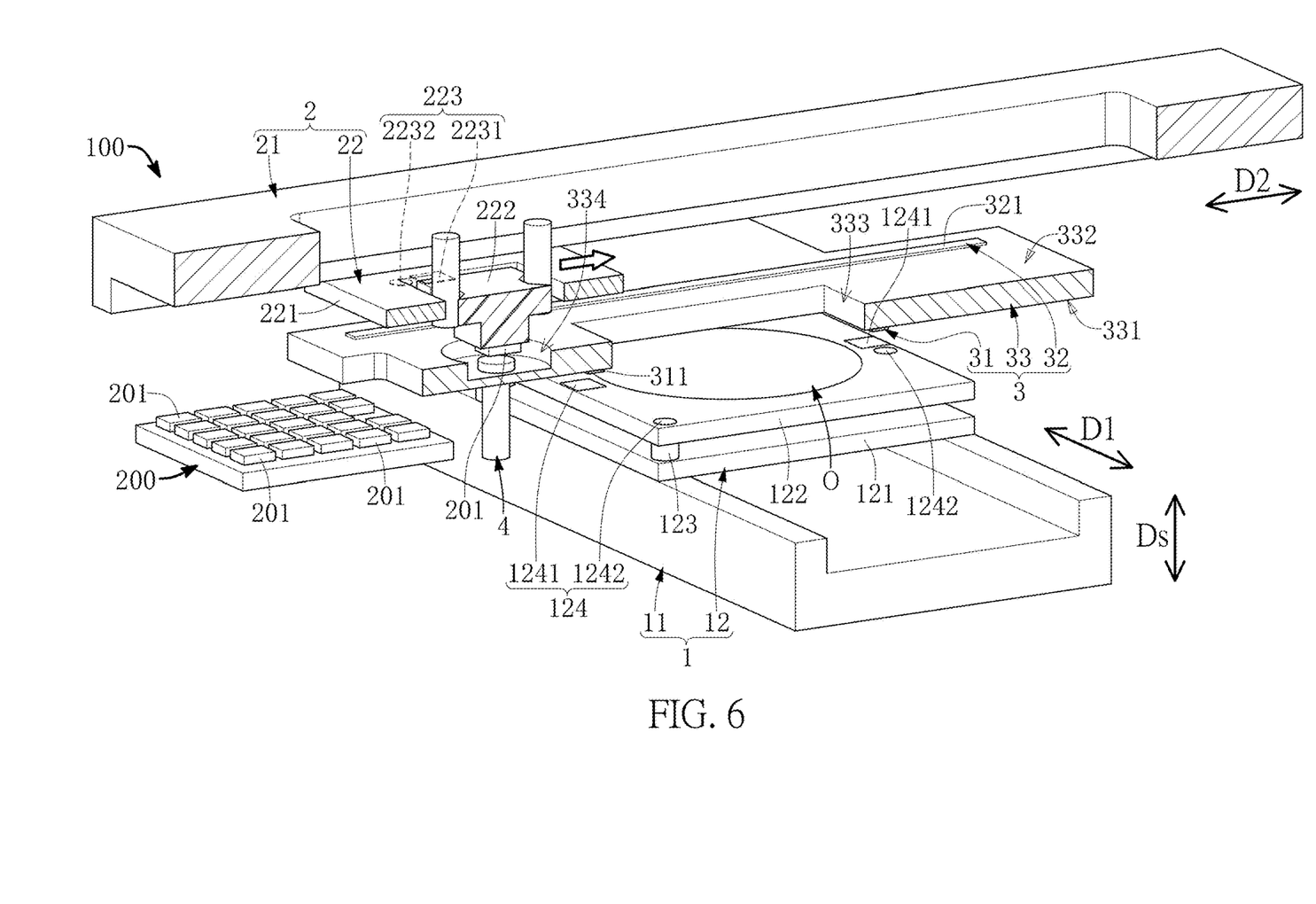
FIG. 6 to FIG. 10 are schematic cross-sectional views showing movements of the multi-axis operation apparatus according to the present disclosure.

Specifically, as shown in FIG. 6, when the predetermined process is the chip-bonding process, the multi-axis operation apparatus 100 preferably uses the correction mechanism 4 to be cooperated with the working member 22, thereby adjusting or confirming a relative position between the capturer 222 and the chip 201 captured (or held) by the capturer 222.

As shown in FIG. 2 to FIG. 4, the correction mechanism 4 and the operation window 333 in the present embodiment are arranged along the second direction D2, and the correction mechanism 4 is located between the two linear encoders 321 of the second calibration 32. The carrier 33 has a detection window 334 arranged at one side of the operation window 333, and the correction mechanism 4 is assembled to the detection window 334. In other words, the correction mechanism 4 is located at a position surrounded by the two encoders 321 and the operation window 333.

Accordingly, the working member 22 is configured to capture a chip 201 from the chip supplying platform 200 (as shown in FIG. 5) that is located outside of the first operation mechanism 1, and the correction mechanism 4 is configured to confirm a position of the chip 201 captured by the working member 22 (as shown in FIG. 6). Moreover, in the predetermined process, the working member 22 is configured to place the chip 201 onto the predetermined region of the target object O along the spacing direction Ds by passing through the operation window 333 (as shown in FIG. 7 and FIG. 8).

Figure 9:
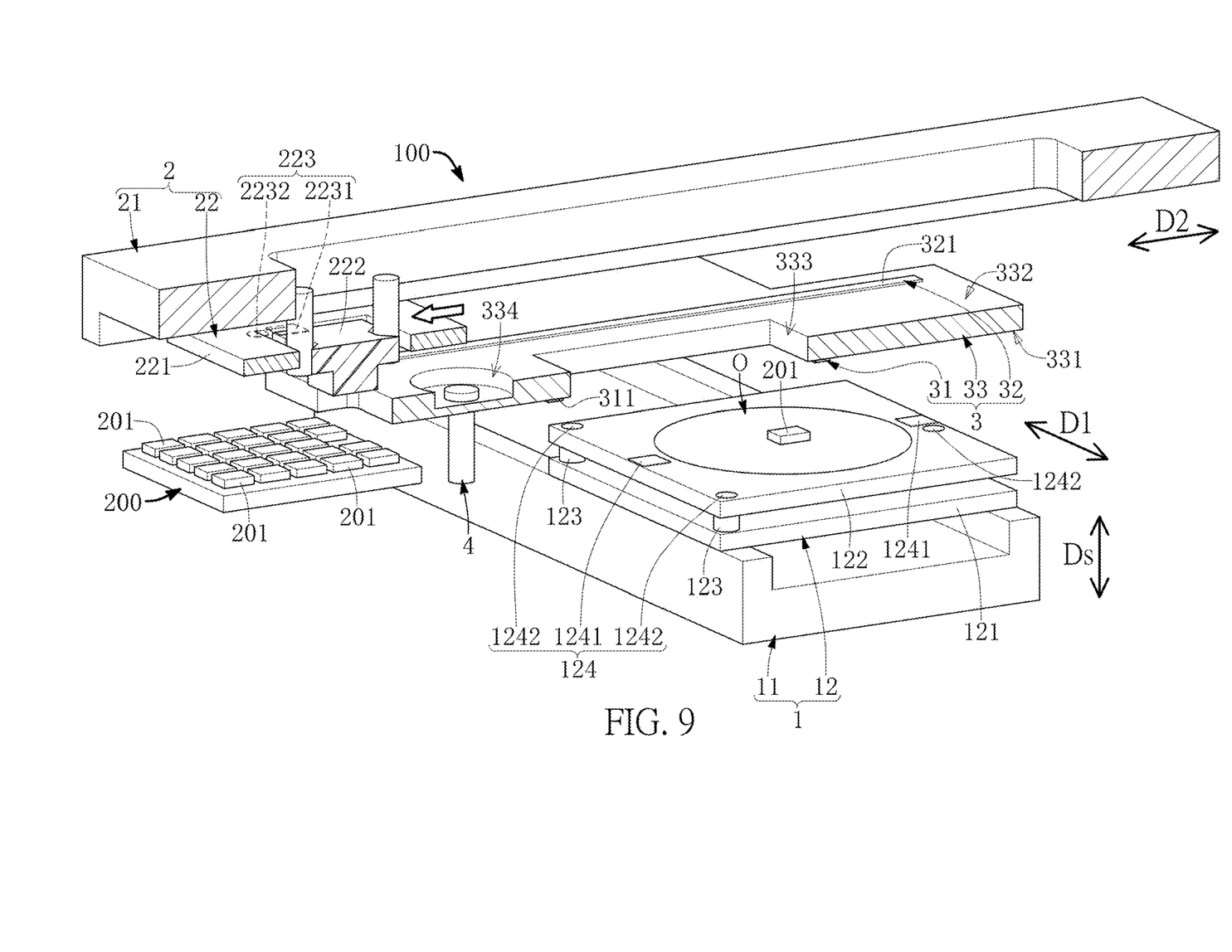
Figure 10:
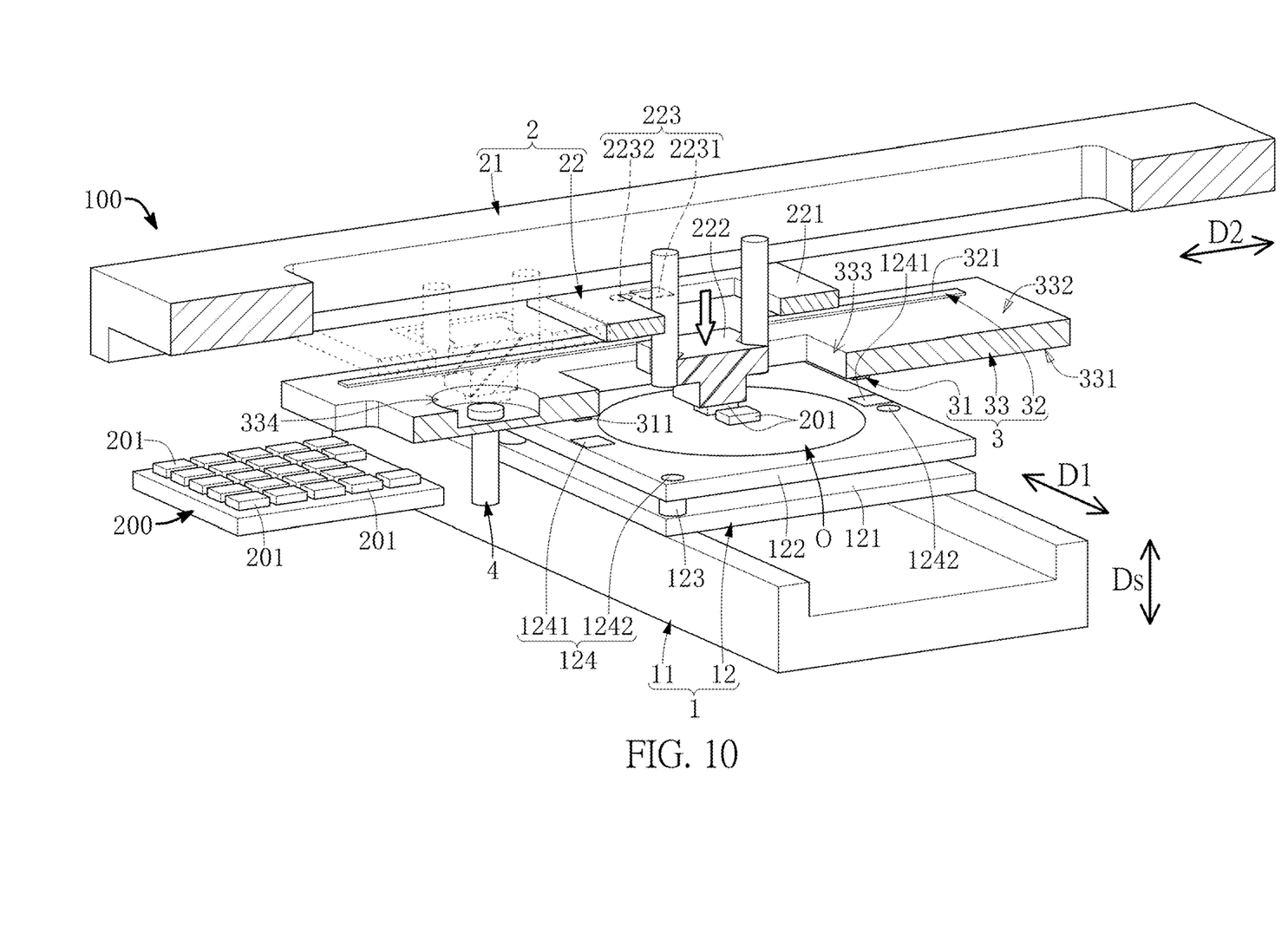

In addition, as shown in FIG. 9 and FIG. 10, the multi-axis operation apparatus 100 can further perform another predetermined process. In other words, the working member 22 can capture another chip 201 from the chip supplying platform 200, and the correction mechanism 4 can confirm a position of the another chip 201 captured by the working member 22, and then the working member 22 can place the another chip 201 onto another predetermined region of the target object O along the spacing direction Ds by passing through the operation window 333.

Beneficial Effects of the Embodiment

In conclusion, the multi-axis operation apparatus of the present disclosure is provided with the indicator that is a fixed alignment reference between the first operation mechanism and the second operation mechanism, so that a distance between the first operation mechanism and the alignment reference (i.e., the indicator) and a distance between the second operation mechanism and the alignment reference (i.e., the indicator) can be effectively decreased, thereby reducing a tolerance occurred in the multi-axis operation apparatus to meet requirements of higher operational accuracy.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-axis operation apparatus in opposite arrangement, comprising:
a first operation mechanism including:
a first rail; and
a carrying platform assembled to the first rail and configured to allow a target object to be disposed thereon, wherein the carrying platform includes a first position sensor and is movable along a first direction relative to the first rail;
a second operation mechanism spaced apart from the first operation mechanism along a spacing direction that is perpendicular to the first direction, wherein the second operation mechanism includes:
a second rail; and
a working member assembled to the second rail and including a second position sensor, wherein the working member is movable along a second direction relative to the second rail, and wherein the second direction is perpendicular to the spacing direction and is not parallel to the first direction; and
an indicator disposed between the first operation mechanism and the second operation mechanism, wherein the indicator includes:
a carrier having an operation window, wherein the working member is configured to face toward the target object along the spacing direction through the operation window; and
a first calibration and a second calibration that are arranged on the carrier, wherein the first position sensor faces toward the first calibration along the spacing direction, and the second position sensor faces toward the second calibration along the spacing direction;
wherein, when the multi-axis operation apparatus is operated to perform a predetermined process, the first position sensor and the second position sensor are in cooperation with the first calibration and the second calibration of the indicator so as to obtain current positions of the carrying platform and the working member, thereby allowing the working member to perform a predetermined step to a predetermined region of the target object along the spacing direction through the operation window.

2. The multi-axis operation apparatus according to claim 1, wherein the first position sensor is movable along a first path, and wherein a first projection region defined by orthogonally projecting the first path onto the carrier along the spacing direction is overlapped with the first calibration.

3. The multi-axis operation apparatus according to claim 2, wherein the second position sensor is movable along a second path, and wherein a second projection region defined by orthogonally projecting the second path onto the carrier along the spacing direction is overlapped with the second calibration.

4. The multi-axis operation apparatus according to claim 1, wherein the operation window has a width in the first direction and a length in the second direction, and the length of the operation window is greater than or equal to an outer diameter of the target object in the second direction.

5. The multi-axis operation apparatus according to claim 4, wherein the width of the operation window is less than an outer diameter of the target object in the first direction, and the carrying platform is movable along the first direction by a first distance that is greater than or equal to a difference between the width of the operation window and the outer diameter of the target object in the first direction.

6. The multi-axis operation apparatus according to claim 1, wherein the carrier is a board having a first board surface and a second board surface that is opposite to the first board surface, the operation window penetrates through the carrier, the first calibration is arranged on the first board surface, and the second calibration is arranged on the second board surface.

7. The multi-axis operation apparatus according to claim 6, wherein each of the first calibration and the second calibration includes a linear encoder, and the first direction is perpendicular to the second direction.

8. The multi-axis operation apparatus according to claim 6, further comprising a correction mechanism, wherein the correction mechanism and the operation window are arranged along the second direction, wherein the working member is configured to capture a chip from a chip supplying platform that is located outside of the first operation mechanism, wherein the correction mechanism is configured to confirm a position of the chip captured by the working member, and wherein, in the predetermined process, the working member is configured to place the chip onto the predetermined region of the target object along the spacing direction by passing through the operation window.

9. The multi-axis operation apparatus according to claim 1, wherein the first position sensor and the first calibration are spaced apart from each other along the spacing direction by a first sensing distance, and the second position sensor and the second calibration are spaced apart from each other along the spacing direction by a second sensing distance that is within a range from 90% to 110% of the first sensing distance.

10. The multi-axis operation apparatus according to claim 9, wherein the carrying platform is movable along the first direction by a first distance, and the first sensing distance is less than 50% of the first distance, and wherein the carrying platform is movable along the second direction by a second distance, and the second sensing distance is less than 50% of the second distance.

* * * * *